US012617093B2

(12) United States Patent
Beardsworth et al.

(10) Patent No.: US 12,617,093 B2
(45) Date of Patent: May 5, 2026

(54) REAL-TIME ROBOTIC CONTROL USING DIGITAL TWIN MODELS

(71) Applicant: Intrinsic Innovation LLC, Mountain View, CA (US)

(72) Inventors: Michael Beardsworth, San Francisco, CA (US); Stoyan Gaydarov, Burlingame, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 187 days.

(21) Appl. No.: 18/545,967

(22) Filed: Dec. 19, 2023

(65) Prior Publication Data

US 2024/0217105 A1     Jul. 4, 2024

Related U.S. Application Data

(60) Provisional application No. 63/435,677, filed on Dec. 28, 2022.

(51) Int. Cl.
B25J 9/16          (2006.01)
(52) U.S. Cl.
CPC ............. B25J 9/1671 (2013.01); B25J 9/163 (2013.01); B25J 9/1653 (2013.01)
(58) Field of Classification Search
CPC ......... B25J 9/1671; B25J 9/163; B25J 9/1653

USPC ......................................................... 700/250
See application file for complete search history.

(56) References Cited

U.S. PATENT DOCUMENTS

| | | | |
|---|---|---|---|
| 2021/0197373 A1* | 7/2021 | Cassero ................. | B25J 9/1653 |
| 2022/0152816 A1* | 5/2022 | Bordignon ............. | B25J 9/1671 |
| 2022/0347846 A1 | 11/2022 | Gaschler et al. | |

* cited by examiner

*Primary Examiner* — B M M Hannan
(74) *Attorney, Agent, or Firm* — Fish & Richardson P.C.

(57) ABSTRACT

Methods, systems, and apparatus, including computer programs encoded on computer storage media, for performing custom real-time control using a digital twin model. One of the methods include receiving a definition of a custom real-time action to be performed in real time by the real-time robotic control system to control a robot; and executing the custom real-time action according to the definition at each tick of a real-time control cycle to effectuate real-time operation of the robot, including: obtaining, by a real-time control process, values of one or more digital twin variables injected from the digital twin model into memory accessible by the real-time control process, computing updated real-time command information according to the definition of the custom real-time action and the values of the one or more digital twin variables injected from the digital twin model, and controlling the robot using the computed real-time command information.

20 Claims, 3 Drawing Sheets

300

Receive a definition of a real-time custom action ⌐ 310

Execute the custom real-time action ⌐ 320

At each tick of a real-time control cycle:

Obtain values of one or more digital twin variables injected from the digital twin model ⌐ 330

Compute updated real-time command information according to the custom real-time action and the values of the one or more digital twin variables ⌐ 340

Control the robot using real-time command information ⌐ 350

FIG. 3

REAL-TIME ROBOTIC CONTROL USING DIGITAL TWIN MODELS

CROSS-REFERENCE TO RELATED APPLICATIONS

This application claims priority to U.S. Provisional Application No. 63/435,677, filed on Dec. 28, 2022. The disclosure of the prior application is considered part of and is incorporated by reference in the disclosure of this application.

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

Due to such timing requirements, software control systems for physical machines are often implemented by closed software modules that are configured specifically for highly-specialized tasks. For example, a robot that picks components for placement on a printed circuit board can be controlled by a closed software system that controls each of the low-level picking and placing actions.

SUMMARY

This specification describes a real-time robotic control framework that implements a digital twin model that corresponds to an operating environment. The digital twin model stores a set of digital twin variables each representing a state of an aspect of the operating environment.

In this specification, a framework is a software system that allows a user to provide higher level program definitions while implementing the lower level control functionality of a real-time robotic system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, e.g., at the order of one millisecond.

Particular embodiments of the subject matter described in this specification can be implemented so as to realize one or more of the following advantages.

The disclosed real-time robotic control framework provides capabilities for a robot to react in a timely and comprehensive manner. By internally maintaining not only the kinematic variables of the robots in an operating environment but also pose variables of objects in the operating environment, the control framework stores a more accurate digital twin model that comes closer to a one-to-one correspondence with the actual operating environment. With this digital twin model, the control framework can provide robot commands by reasoning about the relationship between objects in the operating environment and the state of the robot itself even within tight timing constraints. The disclosed control framework thus facilitates easier and faster development of custom actions and reactions to be executed by the robot that fit the needs of particular robotic tasks. These actions and reactions can be defined in customized terms to different processes being implemented, rather than in abstract and/or obscure sensor signals. Compared to existing solutions, some implementations of the framework allow a user to define such custom actions and reactions with less amount of code, as well as with reusable variable names that improve code maintainability.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for executing a real-time custom action using a digital twin model.

Like reference numbers and designations in the various drawings indicate like elements.

DETAILED DESCRIPTION

Figure 1:
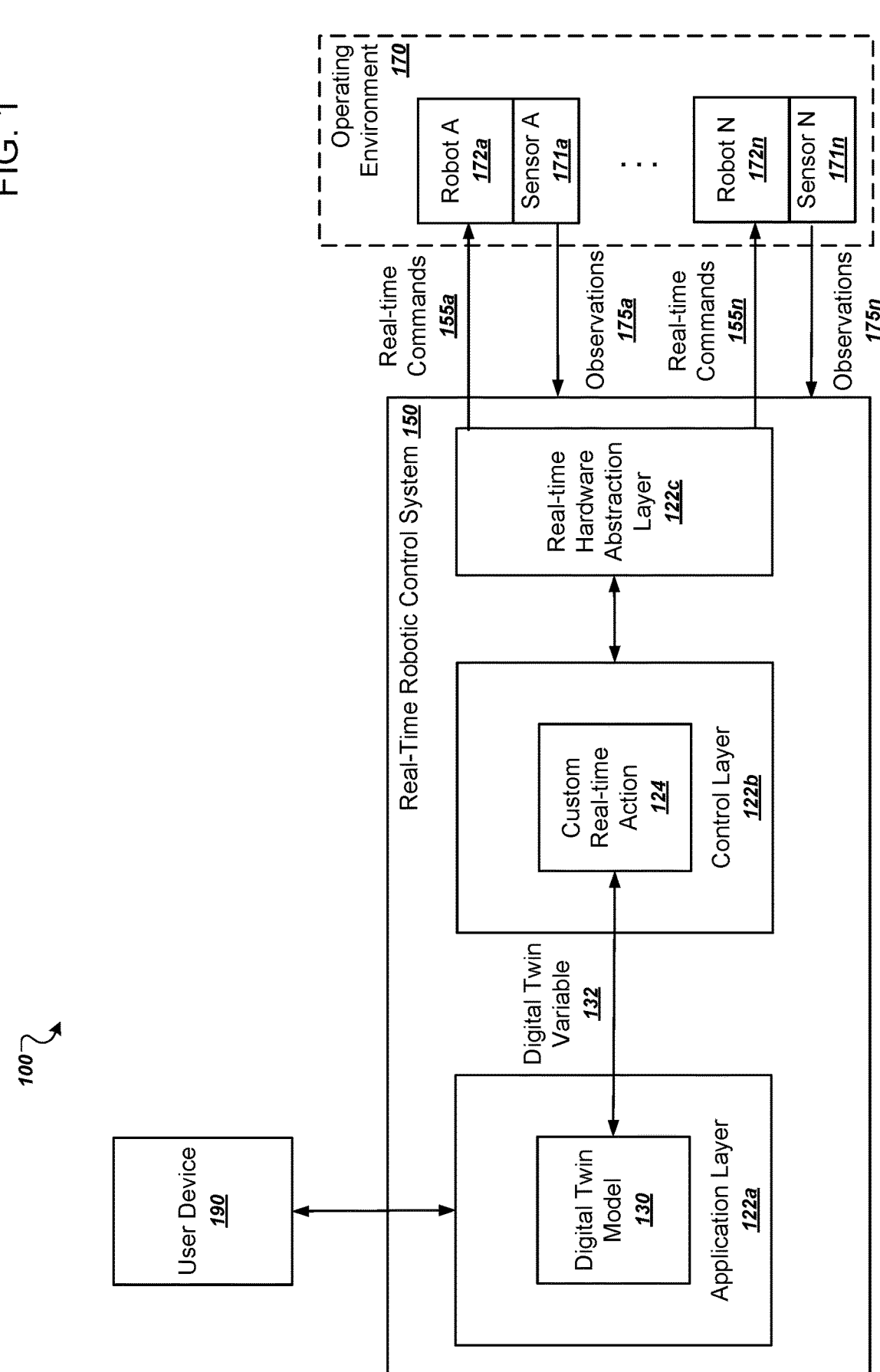
FIG. 1 is a diagram of an example system.

FIG. 1 is a diagram of an example system 100. The system 100 includes a real-time robotic control system 150 to drive multiple robots 172a-n in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotic control framework as described in this specification. In particular, the system 100 can provide a unified framework that allows users to achieve multiple different types of custom real-time control. In this specification, a robotic control system being described as being real-time means that it is required to execute within strict timing requirements to achieve normal operation. The timing requirements specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations, e.g., processing steps for completing a task or function, in a non-real-time system are known as non-deterministic operations, which are not required to complete within a given tick to be successful. In contrast, a real-time system requires deterministic operations, which are required to occur every tick. In non-real-time and real-time systems, a scheduler may be utilized to determine the amount of resources, e.g., network bandwidth, memory, processor cycles, or a combination thereof, that an action is allotted for execution. If no or inadequate resources are allocated, the real-time system can also enter the fault state.

To control the robots 172a-n in the operating environment 170, the real-time robotic control system 150 provides commands, e.g., real-time commands 155a-n, to be executed by one or more robots, e.g., robots 172a-n, in the operating environment 170. In order to compute the real-time commands 155, the real-time robotic control system 150 consumes real-time observations 175a-n made by one or more sensors 171a-n gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

Generally, the real-time robotic control system 150 can provide commands through a control stack that handles providing real-time control commands 155a-n to the robots 172a-n. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122c which executes within strict real-time requirements, e.g., by providing a command at a first, fixed rate, e.g., every 1, 5, 10, or 20 milliseconds, and the highest level is the application layer 122a which executes within non-real-time requirements, e.g., by providing a command at second, lower rate, which may sometimes be a varying rate or a rate that is sporadic, or both. Interposed between the non-real-time application layer 122a and the real-time hardware abstraction layer 122c is a control layer 122b, which handles bridging the boundary between the non-real-time commands generated by upper-level software modules in the control stack 122 and the real-time commands generated by the lower-level software modules in the control stack 122. More details of the control stack 122 are described in commonly owned U.S. patent application Ser. No. 17/246, 082, which is herein incorporated by reference.

The application layer 122a includes a digital twin model 130. The digital twin model 130 represents a latest state of the operating environment 170 that includes the robots 172a-n driven by the system 150. To represent the condition of the operating environment 170, the digital twin model 130 maintains a set of digital twin variables 132 that could be observed or otherwise measured in the operating environment 170. These digital twin variables can include continuous variables, discrete variables, or both and possibly other types of variables. Continuous variables are variables that have possible values that may be any value within some range, while discrete variables are variables that can only take one of a finite or countably infinite number of values. Examples of continuous values include a joint angle of a robot, an orientation of an object, both of which can take many possible different values. Examples of discrete variables, on the other hand, include binary variables indicating whether a particular volume in the operating environment is free space or occupied, and whether a particular object exists in the operating environment or not.

Creation of the digital twin model 130 can involve declaring or instantiating the set of digital twin variables by the real-time robotic control system 150 in the application layer 122a based on information regarding the operating environment 170 provided to the system. For example, information regarding the type of the robots 172a-n in the operating environment 170, and poses (i.e., positions and orientations) and spatial dimensions of objects in the operating environment 170, such as workpieces being operated on by the robots and other environment components, can be submitted to the system by a user of the system. Once created, respective values of the set of digital twin variables maintained by the digital twin model 130 can be continuously updated to reflect the latest state of the operating environment 170 based on real-time observations 175 a-n could be made by the one or more sensors 171a-n making observations within the operating environment, as well as status messages that could be generated by the robot 172a-n.

Figure 2:
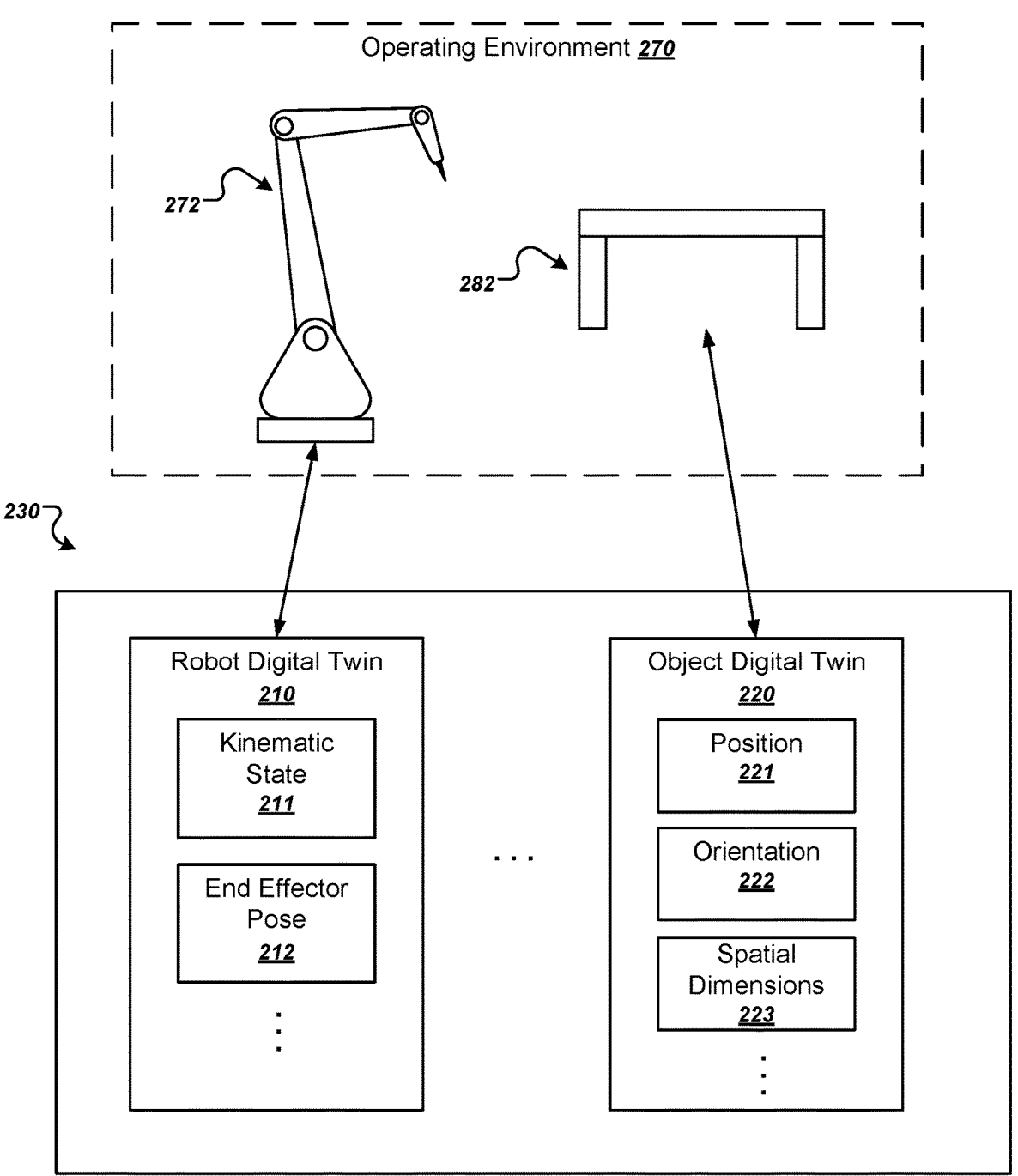
FIG. 2 illustrates an example of a digital twin model that corresponds to an operating environment.

FIG. 2 illustrates an example of a digital twin model 230 that corresponds to an operating environment 270. In the example of FIG. 2, the digital twin model 230 includes a robot digital twin 210 which represents an actual robot 272 in the operating environment 270, and also includes an object digital twin 220 which represents a table object 282 in the operating environment 270, although in other examples, the digital twin model 230 can include more or fewer digital twins depending on the actual layout of the operating environment. More generally, the digital twin model 230 can include a respective digital twin for each robot, each hardware component of the robot, e.g., a gripper or another end effector, each workpiece, e.g., a part, that is being operated on by the robot, each component of the operating environment itself, e.g., a safety fence or a rail in operating environment, instead of or in addition each of other components that may be present in the operating environment.

Each digital twin in turn stores a set of digital twin variables that represent a latest state and, in some implementations, one or more earlier (historic) states of the corresponding hardware component. The set of digital twin variables can be derived from real-time observations made by the one or more sensors, and, in some implementations, known information about how that sensor relates to another sensor, e.g., known distances between two sensors. For example, a distance between a robot and an object can be determined based on (i) a first distance between a sensor and the object as measured by the sensor that is placed at a predetermined position relative to the robot and (ii) a known distance between the sensor and the robot. In some implementations, each digital twin can also contain representations of object geometry, e.g., meshes or parametric CAD models, of the corresponding hardware component.

In the example of FIG. 2, the robot digital twin 210 stores one or more digital twin variables that represent a latest kinematic state 211 of the robot 272. For example, the robot digital twin 210 can have one digital twin variable (as a joint variable) that defines (e.g., in joint-space coordinates) the joint angle of each joint of the robot 272. In addition, the robot digital twin 210 stores one or more digital twin variables that represent a latest end effector pose 212 of the robot 272. For example, the robot digital twin 210 can have a total of six digital twin variables (as pose variables) that collectively define (e.g., in Cartesian-space) the position and orientation of the end effector of the robot 272. The object digital twin 220, on the other hand, stores one or more digital twin variables that represent the position 221 of the table object 282, one or more digital twin variables that represent the orientation 222 of the table 282, and one or more digital twin variables that represent the spatial dimensions 223 (e.g., height, length, and depth) of the table 282. It can be appreciated that, more or fewer variables are used to represent the same or different aspects of each hardware component in the operating environment in other examples. Within each digital twin, the set of digital twin variables can be stored as one or more data objects in any suitable data structure such as a vector, list, array, map, tree, graph, or the like.

Referring back to FIG. 1, a user of the system 100 can initiate the execution of custom real-time control by providing custom real-time control information to the real-time robotic control system 150. For example, a user can use a user device 190 to provide custom real-time control information to the application layer 122a. For example, through an integrated development environment (IDE) executed in the user device 190, the user can write source code that is required to facilitate various types of custom real-time control, including definitions of custom real-time actions, e.g., custom real-time action 124, and custom real-time reactions, e.g., one or more reactions associated with the custom action 124. For example, the source code can be expressed in high-level programming languages, e.g., Object Oriented Programming (OOP) languages, including C++, Python, Lua, and Go. In this specification, an action refers to a motion having precomputed motion parameters, such as moving a tool on a robot arm from point A to point B. A reaction refers to a real-time switch between actions due to certain specified conditions, which can include sensor data that is updated in real-time.

The control layer 122b serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command.

The control layer 122b implements real-time software modules that facilitate various types of custom real-time control, including custom real-time action and custom real-time reaction. Upon being provided with the definition of a custom real-time action, e.g., custom real-time action 124, the control layer 122b can use this definition to produce continuous real-time control signals including, e.g., real-time positions, velocities, or torques for a robot component such as a robot joint, which determine how to drive the motors and actuators of the robots 172a-n in order to effectuate the custom real-time action. The continuous real-time control signals can then be consumed by the hardware abstraction layer 122c.

The hardware abstraction layer 122c implements software module, e.g., a real-time controller module, that interfaces the robot 172a-n, e.g., by issuing real-time commands 155a-n to drive the movements of the moveable components such as joints of the robots 172a-n in the operating environment 170 in accordance with the real-time control signals.

Some advantages of the framework provided by virtue of the digital twin model 130 include allowing a real-time process to use latest environment data that is otherwise impossible to compute the real-time command information, as well as allowing users to specify custom real-time control information more easily than currently possible. In particular, the digital twin model 130 can be queried or invoked during the execution of the custom real-time control code; a query to or invocation of the digital twin model 130, e.g., by having variable names that reference one or more digital twin variables stored therein, by the custom real-time control code would return the latest values of the digital twin variables.

This capability allows a user to provide custom real-time control information by writing less amount of code. For example, because world coordinate frames of the operating environment can now be used in actions defined in Cartesian-space, a custom real-time action to move a robot arm having a gripper attached to the end of it that holds an object to a table can be expressed as simple as "move the object held in the gripper to the table," by having variable names "object," "gripper," and "table" that reference the digital twin variables in the digital twin model corresponding to the object, gripper, and table in the operating environment, instead of as a lengthy chain of multiplications "move the flange to world_to_table.inverse( )*world_to_robot*. . . *flange_to_gripper*gripper_to_object_held."

This capability also allows a user to provide custom real-time control information by having reusable variable names that improve code maintainability. For example, a custom real-time reaction for switching from an action of moving a robot arm with a gripper attached to the end of it to a halt action can be expressed as "switch to the halt action when the gripper is within 1 cm of the table." Conventionally, a custom real-time reaction to achieve similar effects would have to be expressed as "switch to the halt action when the Z position is below $TABLE_POSITION," where the value of $TABLE_POSITION was hand-crafted, and would be required to be reworked every time the table is moved.

This capability further allows a user to provide custom real-time control information by reasoning about the relationship between objects in the operating environment and the state of the robot. For example, a condition of a custom real-time reaction can be expressed as "distance between the gripper and the table <100 mm."

TABLE 1 includes an example of source code written to define custom real-time actions and custom real-time reactions.

TABLE 1

```
1    table_height = world.FindWhereTheTableIs( ) ['z']
2    robot_to_table = world.FindWhereTheRobotIs( ) ['z'] –
3  table_height
4    done_signal = control_api.SignalFlag( )
5    action0 = control_api.Action(
```

TABLE 1-continued

```
6      action_id=0,
7      action_type='point_to_point_move',
8      parts=['arm'],
9      params=move_params_0,
10     reactions=[
11         control_api.Reaction(
12             #condition=
13     control_api.Condition.is_done( ),
14             # stop when the robot is 1cm from the
15     table
16             not_the_condition =
17     control_api.IsLessThan("robot_tip.z", robot_to_table +
18     0.01),
19             condition = control_api.IsLessThan(
20                 control_api.RelativePose("robot_tip",
21     "table") ['tz'],
22                 0.01),
23             responses=[
24
25     control_api.StartActionInRealTime(start_action_id=1),
26             ])
27         ])
28     action1 = control_api.Action(
29         action_id=1,
30         action_type='point_to_point_move',
31         parts=['arm'],
32         params=move_params_1,
33         reactions=[
34             control_api.Reaction(
35                 condition=
36     control_api.Condition.is_done( ),
37                 responses=[
38                     control_api.Signal(done_signal),
39                 ])
40             ])
41     session.add_action_instances([action0, action1])
42     # Starts the sequence action0 => action1.
43     session.start_action(action0.id)
44     # Wait for the sequence to end.
45     done_signal.wait( )
```

For example, the example source code can be executed at the application layer 122*a* of the real-time robotic control system 150 using a set of precomputed movement parameters.

On line 1, a first global variable "table_height" that represents a height dimension of a table is defined. This global variable uses one or more first digital twin variables that represent the spatial dimensions of the table stored in the digital twin model.

On lines 2-3, a second global variable "robot_to_table" that represents a difference between a robot and the table is defined. This global variable uses one or more second digital twin variables that represent an end effector pose of the robot stored in the digital twin model, as well as the one or more first digital twin variables that represents the spatial dimensions of the table.

On line 5, a first action, action0, is defined. The action definition includes an id (line 6), a type (line 7), a part (line 8), and movement parameters (line 9).

As shown on lines 10-27, the first action has a reaction that specifies a condition and a response. The condition is to stop the robot when the robot is below a threshold distance away from the table. The definition of this condition uses both the first and second global variable as already defined above, which in turn uses the digital twin variables stored in the digital twin model. To chain the actions together, the associated response is to kick off a second action having action_id of 1, as shown on line 25.

On line 28, the second action is defined. The second action definition similarly includes an id (line 29), a type (line 30), a part (line 31), and movement parameters (line 32).

The second action, action1, also has a similar associated reaction defined on lines 33-40. The response, however, is simply to generate a signal that the sequence of actions has completed.

On line 41, the first and second actions are added as new action instances.

On line 42, the application layer 122*a* kicks off the real-time action by sending a command to the control layer, referencing the action id. The control layer 122*b* of the system will then initialize the real-time environment and execute the sequence of action0 and action1 in accordance with the definition of the actions, as well as the latest values of the digital twin variables stored in the digital twin model.

On line 44, the application layer can use this signal to wait until the sequence has completed.

In the above example of TABLE 1, during the real-time execution of the source code, the control layer 122*b* parses condition of action0 (defined on lines 16-22), queries the digital twin model for latest values of the first and second digital twin variables, and interprets the output of the functions in order to evaluate the condition. For example, a query to the digital twin model may return a value, e.g., an integer or a floating point value, and the value is interpreted in the context of the corresponding condition.

FIG. 3 is a flowchart of an example process 300 for executing a real-time custom action using a digital twin model. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

The system receives a definition of a custom real-time action to be performed in real time by the real-time robotic control system to control a robot (310). In some cases, the definition of the custom real-time action can be provided, e.g., in the form of source code, by the same entity which runs the real-time robotic control framework, while in other cases, the definition can be provided, e.g., similarly in the form of source code, by a different entity than an entity running or providing the real-time robotic control framework. In those other cases, the different entity can be any entity, such as a third-party developer, with has no preexisting relationship or activity coordination with the operator of the control framework.

In some cases, the custom real-time action can be part of a custom real-time control function which specifies a sequence of actions to be executed with deterministic timing and one or more custom reactions that chain the sequence of actions. To chain the sequence of actions, each custom reaction can include one or more conditions for real-time switching between a pair of actions in the plurality of actions, i.e., real-time switching between completion (or termination) of a first action and the beginning of a second action of the robot.

The definition of the real-time custom action references one or more digital twin variables of a digital twin model corresponding to an operating environment, e.g., the digital twin model 230 corresponding to the operating environment 270 in FIG. 2. When provided in the form of source code, the source code defining the custom real-time action may have variable names that reference various data objects maintained by the digital twin model. In various cases, the source code may have additional variable names that reference data objects belonging to the control layer, the hardware abstraction layer, or both.

Each digital twin variable generally represents a state of an aspect of the operating environment. For example, the digital twin model can maintain respective digital twins corresponding to the robot and a non-robot object, e.g., a table, a workbench, or another hardware component, and the digital twin model can store a first data object that includes (i) one or more digital twin variables each representing a joint angle of the robot as well as a second data object that includes (ii) one or more digital twin variables collectively representing the position and orientation of the non-robot object.

As described above, the digital twin model is maintained at the application layer of the system in which one or more non-real-time processes can be executed. Meanwhile, multiple real-time software control modules residing at either the control layer or the hardware abstraction layer of the system are executed repeatedly in a predetermined sequence (referred to below as a real-time control cycle) in order to provide the real-time commands to effectuate real-time operation of the robot, e.g., to control the robot to perform the custom real-time action.

In computing, a process is the instance of a software module that is being executed. A non-real-time process is a process that is being executed with non-deterministic timing, whereas a real-time process is a process that is being executed with deterministic timing. For example, the application layer can execute a first non-real-time process that corresponds to the digital twin model, and can also execute a second non-real-time process that corresponds to a trajectory generator which provides target trajectory information for a robot component. In this example, the first non-real-time process can update values of the one or more digital twin variables based on real-time observations, status messages, or both, and repeatedly inject, at a rate that is different, e.g., slower, or less deterministic, than a rate of a real-time control cycle of the system, updated values of the digital twin variables into a memory accessible by the control layer of the system in which one or more real-time processes are executed. Likewise, the second non-real-time process can provide target trajectory information, e.g., in the form of trajectory set points ("goal states") for a robot component, at a varying rate or a rate that is sporadic.

The system executes the custom real-time action to effectuate real-time operation of the robot (320). In particular, the system can do this by repeatedly performing following steps 330-350 according to the definition at each tick of a real-time control cycle.

The system obtains, at a real-time control process, values of one or more digital twin variables from the digital twin model (330). The real-time control process can be an instance of one of the real-time software modules within the control layer that are configured to facilitate various types of custom real-time control. For example, the real-time control process can be an instance of a real-time control module configured to process the non-real-time control parameters that have been computed by the application layer for controlling the robot to perform the custom real-time action.

A real-time software module can also contain manufacturing-process-specific behaviors that rely on digital twin information. For example, the real-time control process can be an instance of a real-time control module configured to control the robot to perform a manufacturing-process such as applying paint on a surface of an object while keeping the sprayer normal to the surface at a predetermined distance away from the surface. In this example, locations of the surface will be determined from the digital twin information.

In some implementations where the digital twin model is configured to inject the values of the one or more digital twin variables into an area in memory, the real-time control process can obtain such values from the same area in the memory. For example, the value of each digital twin variable (or a pointer to the digital twin variable) can be stored by the digital twin model into a predefined area in the memory. The memory can be positioned in any suitable location within the system accessible to or shared with the real-time control process. In some implementations, the real-time control process can obtain the values at fixed intervals, e.g., once per tick or once every other tick, while in other implementations, the real-time control process can obtain the values during idle time of the real-time control cycle.

The system computes updated real-time command information according to the definition of custom real-time action and the values of the one or more digital twin variables obtained from the digital twin model (340). In some implementations, the real-time software module which has obtained the variable values step 330, instead of or in addition to another real-time software module within the control layer, can compute this updated the real-time command information. In these implementations, the real-time command information can include continuous real-time control signals including, e.g., real-time positions, velocities, or torques for a robot component such as a robot joint, which determine how to drive the motors and actuators of the robot in order to effectuate the custom real-time action.

For example, a developer of source code that defines the custom real-time action may write functions that include variable names that reference one or more data objects of digital twin variables maintained by the digital twin model, instead of providing their own values of the variables in the functions or otherwise defining their own logics for generating such values. The digital twin model will share the latest values of the variables with the calling function in the source code. During execution, the system can then compute, at the control layer, the real-time control signals based on the latest values of the digital twin variables.

As another example, a developer of source code that defines the custom real-time reaction may configure a condition by writing expressions that include variable names that reference one or more data objects of digital twin variables maintained by the digital twin model, and the digital twin model can be invoked by the control layer to share the latest values of the digital twin variables. During execution, the system can then evaluate, at the control layer, the condition of the custom reaction according to the obtained values.

The system controls the robot using the computed real-time command information (350). In some implementations, the hardware abstraction layer, which implements software modules, e.g., a real-time controller module, that interface the robot, can consume the real-time command information to issue real-time commands to drive the movements of the moveable components such as joints of the robot in the operating environment in accordance with the real-time control signals.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method performed by a real-time robotic control system, the method comprising:

receiving a definition of a custom real-time action to be performed in real time by the real-time robotic control system to control a robot, wherein the definition of the real-time custom action references one or more variables of a digital twin model maintained in a non-real-time process; and executing the custom real-time action according to the definition at each tick of a real-time control cycle to effectuate real-time operation of the robot, including:

obtaining, by a real-time control process, values of one or more digital twin variables injected from the digital twin model into memory accessible by the real-time control process, computing updated real-time command information according to the definition of the custom real-time action and the values of the one or more digital twin variables injected from the digital twin model, and controlling the robot using the computed real-time command information.

Embodiment 2 is the method of embodiment 1, wherein the one or more digital twin variables represent a non-robot state of an object in the operating environment.

Embodiment 3 is the method of embodiment 2, wherein the one or more digital twin variables represent a position of the object in the environment.

Embodiment 4 is the method of any one of embodiments 1-2, further comprising:

repeatedly injecting, by the non-real-time process, updated values of the one or more digital twin variables into the memory accessible by the real-time control process.

Embodiment 5 is the method of embodiment 4, wherein repeatedly injecting the updated values occurs at a rate that is slower than a rate of the real-time control cycle.

Embodiment 6 is the method of any one of embodiments 1-5, wherein obtaining, by the real-time control process, the values of the one or more digital twin variables comprises obtaining the values during idle time of the real-time control cycle.

Embodiment 7 is the method of any one of embodiments 1-6, wherein the definition of the custom real-time action comprises source code having variable names that reference objects maintained by the digital twin model in the non-real-time process.

Embodiment 8 is the method of embodiment 7, wherein the definition of the real-time custom action also references objects belonging to the real-time control process.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method performed by a real-time robotic control system, the method comprising:

receiving a definition of a custom real-time action to be performed in real time by the real-time robotic control system to control a robot, wherein the definition of the custom real-time action references one or more variables of a digital twin model maintained in a non-real-time process; and executing the custom real-time action according to the definition at each tick of a real-time control cycle to effectuate real-time operation of the robot, including:

obtaining, by a real-time control process, values of one or more digital twin variables injected from the digital twin model into memory accessible by the real-time control process, computing real-time command information according to the definition of the custom real-time action and the values of the one or more digital twin variables injected from the digital twin model, and controlling the robot using the computed real-time command information.

2. The method of claim 1, wherein the one or more digital twin variables represent a non-robot state of an object in an operating environment.

3. The method of claim 2, wherein the one or more digital twin variables represent a position of the object in the environment.

4. The method of claim 1, further comprising:

repeatedly injecting, by the non-real-time process, values of the one or more digital twin variables into the memory accessible by the real-time control process.

5. The method of claim 4, wherein repeatedly injecting the values occurs at a rate that is slower than a rate of the real-time control cycle.

6. The method of claim 1, wherein obtaining, by the real-time control process, the values of the one or more digital twin variables comprises obtaining the values during idle time of the real-time control cycle.

7. The method of claim 1, wherein the definition of the custom real-time action comprises source code having variable names that reference objects maintained by the digital twin model in the non-real-time process.

8. The method of claim 7, wherein the definition of the custom real-time action also references objects belonging to the real-time control process.

9. A system comprising:

one or more processors and one or more storage devices storing instructions that, when executed by the one or more processors, cause the one or more processors to perform operations comprising:

receiving a definition of a custom real-time action to be performed in real time by the real-time robotic control system to control a robot, wherein the definition of the custom real-time action references one or more variables of a digital twin model maintained in a non-real-time process; and executing the custom real-time action according to the definition at each tick of a real-time control cycle to effectuate real-time operation of the robot, including:

obtaining, by a real-time control process, values of one or more digital twin variables injected from the digital twin model into memory accessible by the real-time control process, computing real-time command information according to the definition of the custom real-time action and the values of the one or more digital twin variables injected from the digital twin model, and controlling the robot using the computed real-time command information.

10. The system of claim 9, wherein the one or more digital twin variables represent a non-robot state of an object in an operating environment.

11. The system of claim 10, wherein the one or more digital twin variables represent a position of the object in the environment.

12. The system of claim 9, wherein the operations further comprise: repeatedly injecting, by the non-real-time process, values of the one or more digital twin variables into the memory accessible by the real-time control process.

13. The system of claim 12, wherein repeatedly injecting the values occurs at a rate that is slower than a rate of the real-time control cycle.

14. The system of claim 9, wherein obtaining, by the real-time control process, the values of the one or more digital twin variables comprises obtaining the values during idle time of the real-time control cycle.

15. The system of claim 9, wherein the definition of the custom real-time action comprises source code having variable names that reference objects maintained by the digital twin model in the non-real-time process.

16. The system of claim 15, wherein the definition of the custom real-time action also references objects belonging to the real-time control process.

17. A non-transitory computer storage medium encoded with a computer program, the program comprising instructions that, when executed by one or more processors, cause the one or more processors to perform operations comprising:

receiving a definition of a custom real-time action to be performed in real time by the real-time robotic control system to control a robot, wherein the definition of the custom real-time action references one or more variables of a digital twin model maintained in a non-real-time process; and executing the custom real-time action according to the definition at each tick of a real-time control cycle to effectuate real-time operation of the robot, including:

obtaining, by a real-time control process, values of one or more digital twin variables injected from the digital twin model into memory accessible by the real-time control process, computing real-time command information according to the definition of the custom real-time action and the values of the one or more digital twin variables injected from the digital twin model, and controlling the robot using the computed real-time command information.

18. The non-transitory computer storage medium of claim 17, wherein the one or more digital twin variables represent a non-robot state of an object in an operating environment.

19. The non-transitory computer storage medium of claim 18, wherein the one or more digital twin variables represent a position of the object in the environment.

20. The non-transitory computer storage medium of claim 18, wherein the operations further comprise:

repeatedly injecting, by the non-real-time process, values of the one or more digital twin variables into the memory accessible by the real-time control process.

* * * * *